United States Patent [19]

Stille et al.

[11] Patent Number: 5,878,397
[45] Date of Patent: Mar. 2, 1999

[54] METHOD FOR TRANSPORTING SHORT MESSAGES IN A WIRELESS TELECOMMUNICATIONS SYSTEM

[75] Inventors: Mats Stille; Per Willars, both of Stockholm, Sweden

[73] Assignee: Telefonaktiebolaget L M Ericsson (publ), Stockholm, Sweden

[21] Appl. No.: 677,982

[22] Filed: Jul. 10, 1996

[51] Int. Cl.⁶ ........................................ H04Q 7/00
[52] U.S. Cl. .................. 704/466; 704/433; 704/445; 704/560
[58] Field of Search .................. 455/433, 437, 455/439, 466, 422, 403, 560, 445

[56] References Cited

U.S. PATENT DOCUMENTS

| | | | |
|---|---|---|---|
| 5,062,108 | 10/1991 | Bales et al. | 370/110.1 |
| 5,159,594 | 10/1992 | Bales et al. | 370/110.1 |
| 5,289,472 | 2/1994 | Cho | 370/110.1 |
| 5,428,822 | 6/1995 | Helenius et al. | 455/433 |
| 5,440,613 | 8/1995 | Fuentes | 379/60 |
| 5,526,400 | 6/1996 | Nguyen | 379/59 |
| 5,530,931 | 6/1996 | CooK-Hellberg et al. | 379/211 |
| 5,561,840 | 10/1996 | Alversalo et al. | 455/433 |
| 5,577,102 | 11/1996 | Koivunen | 455/433 |
| 5,590,397 | 12/1996 | Kojima | 455/433 |
| 5,628,051 | 5/1997 | Salin | 455/433 |
| 5,649,301 | 7/1997 | Yabusaki et al. | 455/433 |
| 5,682,600 | 10/1997 | Salin | 455/433 |
| 5,689,568 | 11/1997 | Laborde | 455/433 |
| 5,711,006 | 1/1998 | Brochu et al. | 455/433 |

FOREIGN PATENT DOCUMENTS

| | | |
|---|---|---|
| 0 597 569 A2 | 7/1993 | European Pat. Off. . |
| 0 622 928 A1 | 2/1994 | European Pat. Off. . |
| 0 714 214 A2 | 5/1996 | European Pat. Off. . |
| 06006303 A | 1/1994 | Japan . |
| 2 254 520 | 10/1992 | United Kingdom . |
| WO 94/07338 | 3/1994 | WIPO . |
| WO 94/16532 | 7/1994 | WIPO . |
| WO 95/07008 | 3/1995 | WIPO . |
| WO 95/12933 | 5/1995 | WIPO . |

*Primary Examiner*—David R. Hudspeth
*Assistant Examiner*—Daniel Abebe
*Attorney, Agent, or Firm*—Jenkens & Gilchrist, P.C.

[57] ABSTRACT

A method and apparatus for transporting a short message between a subscriber terminal and a digital telecommunications system is disclosed. A short message including user information and control data is created at the subscriber terminal. The short message user information is inserted into a user information field in a call setup message, in accordance with a standard call control protocol. A predetermined code is inserted into a locking shift field in the call setup message, which creates a short message control data field in the call setup message. The short message control data is inserted into the short message control data field in the call setup message, and the call setup message is transported between the subscriber terminal and the system. Also, a method and apparatus for transporting the short message between the digital telecommunications system and a short message service center is disclosed. The short message user information is inserted into a user field of an initial address message, in accordance with an ISUP protocol. The short message control data is inserted in an access transport field of the initial address message, and the initial address message is transported between the digital communications system and the short message service center.

42 Claims, 4 Drawing Sheets

| BIT | | | | | | | | OCTET |
|---|---|---|---|---|---|---|---|---|
| 8 | 7 | 6 | 5 | 4 | 3 | 2 | 1 | |
| 1 | 0 | 0 | 1 | 0 | 1 | 1 | 0 | 1 |
| LOCKING SHIFT PROCEDURE (CODESET 6) | | | | | | | | |
| 0 | 0 | 0 | 0 | 0 | 0 | 1 | 1 | 2 |
| | SHORT MESSAGE INFORMATION ELEMENT IDENTIFIER | | | | | | | |
| LENGTH OF SHORT MESSAGE INFORMATION ELEMENT | | | | | | | | 3 |
| VERSION | | | | SERVICE REQUEST | | | | 4 |
| 0 | 0 | 0 | 0 | 0 | 0 | 0 | 1 | 5 |
| ORIGINATING ADDRESS IDENTIFIER | | | | | | | | |
| LENGTH OF ORIGINATING ADDRESS | | | | | | | | 5a |
| ODD/EVEN | TYPE OF NUMBER | | | NUMBERING PLAN IDENTIFICATION | | | | 5b |
| ADDRESS DIGITS | | | | | | | | 5c |
| 0 | 0 | 0 | 0 | 0 | 0 | 1 | 0 | 6 |
| SERVICE CENTRE TIME STAMP IDENTIFIER | | | | | | | | |
| 2nd DIGIT (DAY) | | | | SPARE | | | | 6a |
| | | | | 1 | 1 | 1 | 1 | |
| 4th DIGIT (HOUR) | | | | 3rd DIGIT (HOUR) | | | | 6b |
| 6th DIGIT (MINUTE) | | | | 5th DIGIT (MINUTE) | | | | 6c |
| 0 | 0 | 0 | 0 | 0 | 0 | 1 | 1 | 7 |
| MESSAGE REFERENCE IDENTIFIER | | | | | | | | |
| MESSAGE REFERENCE | | | | | | | | 7a |

| BIT | | | | | | | | | OCTET |
|---|---|---|---|---|---|---|---|---|---|
| 8 | 7 | 6 | 5 | 4 | 3 | 2 | 1 | | |
| 0 | 0 | 0 | 0 | 0 | 1 | 0 | 0 | DEFERRED TIME DELIVERY IDENTIFIER | 8 |
| \multicolumn{4}{l|}{SPARE} | 1 | 1 | \multicolumn{2}{l|}{2nd DIGIT (DAY)} | | 8a |
| \multicolumn{4}{l|}{4th DIGIT (HOUR)} | \multicolumn{4}{l|}{3rd DIGIT (HOUR)} | | 8b |
| \multicolumn{4}{l|}{6th DIGIT (MINUTE)} | \multicolumn{4}{l|}{5th DIGIT (MINUTE)} | | 8c |
| 0 | 0 | 0 | 0 | 0 | 1 | 0 | 1 | VALIDITY PERIOD IDENTIFIER | 9 |
| \multicolumn{4}{l|}{SPARE} | 1 | 1 | \multicolumn{2}{l|}{2nd DIGIT (DAY)} | | 9a |
| \multicolumn{4}{l|}{4th DIGIT (HOUR)} | \multicolumn{4}{l|}{3rd DIGIT (HOUR)} | | 9b |
| \multicolumn{4}{l|}{6th DIGIT (MINUTE)} | \multicolumn{4}{l|}{5th DIGIT (MINUTE)} | | 9c |
| 0 | 0 | 0 | 0 | 0 | 1 | 1 | 0 | MESSAGE STATUS IDENTIFIER | 10 |
| | | | | | | | | MESSAGE STATUS | 10a |
| 0 | 0 | 0 | 0 | 0 | 1 | 1 | 1 | PROTOCOL IDENTIFIER IDENTIFIER | 11 |
| | | | | | | | | PROTOCOL IDENTIFIER | 11a |

| BIT | | | | | | | | | OCTET |
|---|---|---|---|---|---|---|---|---|---|
| 8 | 7 | 6 | 5 | 4 | 3 | 2 | 1 | | |
| 0 | 0 | 0 | 0 | 1 | 0 | 0 | 0 | DESTINATION ADDRESS IDENTIFIER | 12 |
| \multicolumn{8}{l|}{LENGTH OF DESTINATION ADDRESS} | | 12a |
| ODD/EVEN | \multicolumn{3}{l|}{TYPE OF NUMBER} | \multicolumn{4}{l|}{NUMBERING PLAN IDENTIFICATION} | | 12b |
| \multicolumn{8}{l|}{ADDRESS DIGITS} | | 12c |
| 0 | 0 | 0 | 0 | 1 | 0 | 0 | 1 | NOTIFICATION REQUEST AND PRIORITY IDENTIFIER | 13 |
| \multicolumn{6}{l|}{SPARE} | P | N | | 13a |
| 0 | 0 | 0 | 0 | 1 | 0 | 1 | 0 | RECEPTION TIME IDENTIFIER | 14 |
| \multicolumn{4}{l|}{SPARE} | 1 | 1 | \multicolumn{2}{l|}{2nd DIGIT (DAY)} | | 14a |
| \multicolumn{4}{l|}{4th DIGIT (HOUR)} | \multicolumn{4}{l|}{3rd DIGIT (HOUR)} | | 14b |
| \multicolumn{4}{l|}{6th DIGIT (MINUTE)} | \multicolumn{4}{l|}{5th DIGIT (MINUTE)} | | 14c |

*FIG. 4C* ns,397

METHOD FOR TRANSPORTING SHORT MESSAGES IN A WIRELESS TELECOMMUNICATIONS SYSTEM

BACKGROUND OF THE INVENTION

1. Field of the Invention

The present invention relates generally to the telecommunications field and, in particular, to the transporting of short text messages to subscribers in a wireless telecommunications system.

2. History of Related Art

The Global System for Mobile Communications (GSM) is a digital, mobile cellular radiotelephone system that has been introduced as a standard in several European countries. The basic telecommunications services supported by the GSM include two-way voice communications between fixed and mobile subscribers, CCITT Group 3 facsimile transmissions, and synchronous and asynchronous data transmissions at rates of up to 9.6 kbits/s.

A special telecommunications service supported by the GSM is the Short Message Service (SMS). The SMS enables the GSM to route short text messages, each up to 160 alphanumeric characters long, over the signaling channels to or from mobile stations. If a mobile station for which a short message is intended is not in service, or has left the coverage area, the message is stored in a Short Message Service Center (SMS-C). The SMS-C forwards the message to the mobile station when it returns to service or re-enters the coverage area. The SMS can also transfer short messages between a Short Message Service Terminal (SMT) in a data network and GSM mobile stations.

The GSM is divided into a switching subsystem and base station subsystem. A call from a mobile station is received by a base transceiver station, which is part of the base station subsystem. The base transceiver station defines an individual cell in a geographical service area. A base station controller also in the base station subsystem controls a group of base transceiver stations (cells). A number of base station controllers are served by a mobile services switching center (MSC), which forms a part of the switching subsystem. The MSC controls calls to and from other telephone and data communications systems, such as the Public Switched Telephone Network (PSTN), Integrated Services Digital Network (ISDN), Public Land Mobile Network (PLMN), and various public and private data networks.

If a user in another network (e.g., PSTN) calls a GSM subscriber, the call is connected to a gateway MSC (GMSC). The GMSC finds the location of the GSM subscriber by interrogating a home location register (HLR), which is a database in the switching subsystem. The HLR provides the address of the GSM subscriber in its most current MSC area. The GMSC routes the call to that MSC. The current location of the GSM subscriber is maintained in a visitor location register (VLR), a database containing information about all of the GSM subscribers currently located in that MSC's area. If the GSM subscriber roams into a new MSC area, the VLR associated with the new MSC requests information about the subscriber from the HLR. At the same time, the HLR is informed about the new MSC area in which the subscriber resides.

In the GSM, a short message can be mobile originated or mobile terminated. A mobile originated short message is submitted from a mobile terminal via a base transceiver station to the visited MSC. The visited MSC forwards the message to the SMS-C given by the originating mobile terminal. The SMS-C forwards the message to its destination, which can be a mobile station or a terminal in the data network.

A mobile terminated short message is submitted by a user directly to an SMS-C. The SMS-C forwards the message to a short message service-gateway mobile services switching center (SMS-GMSC). The SMS-GMSC interrogates the related HLR for transporting information, and reroutes the message to the appropriate MSC. The destination mobile station is paged and a connection is set up between the MSC and the mobile station. Upon set up, the MSC forwards the message to the mobile station via the signaling channel (e.g., stand alone dedicated control channel or SDCCH). If the message was delivered successfully, a notification report is sent from the MSC to the originating SMS-C. If not, the HLR is so informed and a failure report is sent from the MSC to the originating SMS-C. The notification report or failure report can be sent to the message originator by the SMS-C.

In order for a user to receive and send text in a short message, certain short message control data is provided to the SMS-C. This control data allows the message originator to specify the destination subscriber to the SMS-C, along with, for example, when (e.g., at 4:00 p.m.) and how (e.g., by facsimile) the text is to be sent to the destination. In the GSM, the SMS has been implemented by the inclusion of an exclusive SMS protocol in parallel with a Q.931 message-oriented call control protocol.

The Q.931 call control interface (also referred to as CCITT Recommendation I.451) is a protocol that specifies what goes into a signaling packet and also defines the message type and content. Specifically, the Q.931 call control interface provides for call setup and take down, the called party number, calling party number information, bearer capability (e.g., voice or data), status checks (for recovery from abnormal events, such as protocol failures or "busy" trunks), release of bearer channels, and error announcements. The Q.931 call control interface is derived from the CCITT Digital Subscriber Signaling System No. 1 (DSS1) user-network ISDN interface.

In other digital mobile radiotelephone systems, such as, for example, the Personal Digital Cellular (PDC) System (also known as the Japanese Digital Cellular Radio System or JDC), and in fixed ISDNs, the Q.931 call control interface has been specified for use, but no parallel SMS interface has been provided. Consequently, although short message text information can be transported in these networks via the existing Q.931 interface, a problem arises in attempting to transport short message control data without a special SMS interface.

A conventional solution to this problem is to include the short message call control data in the Q.931 User-User Information Element (UUIE) field along with the short message text. However, this solution creates another problem, because the more control data that is included in the UUIE, the less text that can be input to the UUIE by the message originator, and the UUIE already has a very limited length (128 octets).

Another problem arises in attempting to send a short message between an MSC and an SMS-C. The conventional technique is to send the short message using the network interface signaling PDC Mobile Application Part (MAP) protocol. In systems other than the GSM, the use of the MAP protocol to transport a short message to a receiving SMS-C is relatively inefficient and thus problematic. For example, fixed ISDNs (and PDC operators) use a number 7 signaling-based ISDN user part (ISUP) protocol. Consequently, the use of a MAP protocol would force the fixed ISDNs (and PDC operators) to introduce and use a MAP protocol over the existing ISUP protocol, which would increase the design complexity significantly and add at least substantial software costs. Furthermore, since many SMS-Cs are integrated with a voice mail system center, and such voice mail system centers use an ISUP protocol to communicate with an MSC, it is advantageous to use that already existing ISUP protocol for communications between the SMS-C and the MSC. Furthermore, using a MAP protocol to transfer a release command between an MSC and SMS-C does not allow the SMS-C to immediately terminate the connection to the MSC, which ties up that circuit for an unnecessarily long period of time.

SUMMARY OF THE INVENTION

It is an object of the present invention to provide a method and apparatus for transporting short messages in a digital telecommunications system without a special short message service interface.

It is also an object of the present invention to minimize the design complexity of the hardware and software used to store and forward short messages.

It is another object of the present invention to minimize circuit connection time while a short message is being transported between subscribers in a digital telecommunications system.

In accordance with one aspect of the present invention, the foregoing and other objects are achieved by a method and apparatus for transporting a short message between a subscriber terminal and a digital telecommunications system, by creating a short message including user information and control data at the subscriber terminal, and in accordance with a standard user-network interface call control protocol, inserting a predetermined code into a locking shift field in a call setup message, thereby creating a short message control data field in the call setup message, inserting the short message control data into the short message control data field in the call setup message, and transferring the call setup message between the subscriber terminal and the system.

In accordance with another aspect of the present invention, the foregoing and other objects are achieved by a method and an apparatus for transporting a short message composed of user information and control data within a digital telecommunications system, and between the digital telecommunications system and a short message service center, by inserting the short message control data in an access transport field of a call setup message, in accordance with a standard network-node interface call control protocol, and transferring the call setup message between the digital communications system and the short message service center.

BRIEF DESCRIPTION OF THE DRAWINGS

A more complete understanding of the method and apparatus of the present invention may be had by reference to the following detailed description when taken in conjunction with the accompanying drawings wherein:

FIGS. 4A–D are diagrams illustrating an exemplary short message control information element that can be used to transfer short message control data in a Q.931 call control set up message, in accordance with the preferred embodiment of the present invention.

DETAILED DESCRIPTION OF THE DRAWINGS

The preferred embodiment of the present invention and its advantages are best understood by referring to FIGS. 1–4 of the drawings, like numerals being used for like and corresponding parts of the various drawings.

Figure 1:
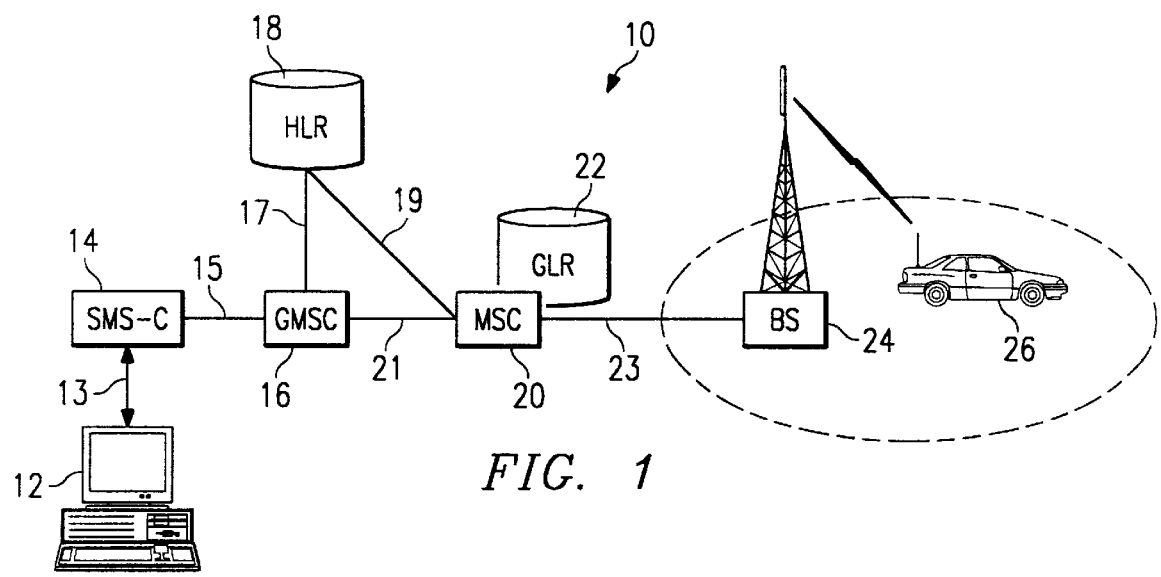
FIG. 1 is a top level block diagram of a digital cellular mobile telecommunication system, which illustrates a method and apparatus for transporting short messages in accordance with a preferred embodiment of the present invention.

FIG. 1 is a top level block diagram of a digital cellular mobile telecommunication system, which illustrates a method and apparatus for transporting short messages in accordance with a preferred embodiment of the present invention. The embodiment shown in FIG. 1 illustrates how short messages can be routed in a PDC System type of configuration. However, the embodiment shown is for illustrative purposes only, and the invention is not intended to be so limited. Essentially, as described in more detail below, the inventive concept can be used for transporting short messages in any mobile or fixed digital telecommunications system that uses a Q.931 or similar type of call control interface. For example, the present invention can also be implemented in a North American PCS 1900, European GSM, or fixed ISDN system.

The cellular communications system 10 illustrated by FIG. 1 includes a short message terminal (SMT) 12 connected by a data communications line 13 to a short message service center (SMS-C) 14. A user may originate or receive a short message via SMT 12, which can be, for example, one of a plurality of SMTs in a data network, such as a PSTN. SMS-C 14 functions as a short message interface unit between the data network and any PLMN. In this embodiment, the PLMN illustrated by FIG. 1 is a version of the PDC System operating in Japan. SMS-C 14 is connected by a data communications line 15 to a gateway mobile services switching center (GMSC) 16. SMS-C 14 stores and forwards short messages to and from SMT 12 (and also to and from one or more mobile stations in the PLMN). SMS-C 14 can be a GSM or similarly configured type of SMS-C. For example, SMS-C 14 can be an MXE store and forward switching system, manufactured by Ericsson. Alternatively, a GMSC configured for storing and forwarding short messages may be substituted for SMS-C 14. As such, SMT 12 would be connected directly to the GMSC (e.g., GMSC 16). GMSC 16 is connected by a signaling network (e.g., number 7) 17 to a home location register (HLR) 18. HLR 18 is a database for storing and controlling individual subscriber data for all those subscribers registered with the PLMN (e.g., in cellular communications system 10). HLR 18 also contains information about the current location of each of the subscriber mobile stations (i.e., the MSC location area in which each mobile station currently resides). For a mobile terminated short message, GMSC 16 has to determine the location of the mobile station being called. GMSC 16 interrogates HLR 18, which replies with the address of the MSC in which the called mobile station currently resides.

For a mobile terminated short message, HLR 18 communicates with MSC 20 over a signaling network 19, and GMSC 16 communicates with MSC 20 over a data communications line 21 using an ISUP protocol. However, for a mobile originated short message, since GMSC 16 does not have to determine the current location of the calling mobile station, SMS-C 14 can be connected directly by a data communications line (not explicitly shown) to MSC 20. MSC 20 includes a gate location register (GLR) 22, which is a database that contains information about all of the mobile stations currently located within the MSC 20 area. A visitor location register (VLR) may be substituted for GLR 22. In a PDC environment, a VLR/MSC combination is referred to as a visited MSC (VMSC). As a mobile station roams into a new MSC area, the GLR connected to that MSC requests information about that mobile station from HLR 18. At the same time, the GLR informs HLR 18 about the mobile station's current location (e.g., that MSC area in which the mobile station currently resides). Consequently, for a mobile terminated short message, GMSC 16 obtains the address of the MSC in which the called mobile station currently resides, from HLR 18. GMSC 16 can reroute the short message to the correct MSC. When the short message reaches that MSC, the GLR associated with that MSC will know where that mobile station is located (e.g., which cell) and can switch the message through to the mobile station.

In the embodiment illustrated by FIG. 1, MSC 20 is connected by a data communications line 23 to base station 24. Base station 24 is one of a plurality of base stations that are connected to and controlled by MSC 20. Each base station defines a cell that operates in a specific one of a set of radio channels. A mobile terminated short message can be transmitted from base station 24 to mobile station 26 over such a radio signaling channel. For a mobile originated short message, the message can be transmitted from mobile station 26 to base station 24 over the same or a different radio signaling channel.

Figure 2:
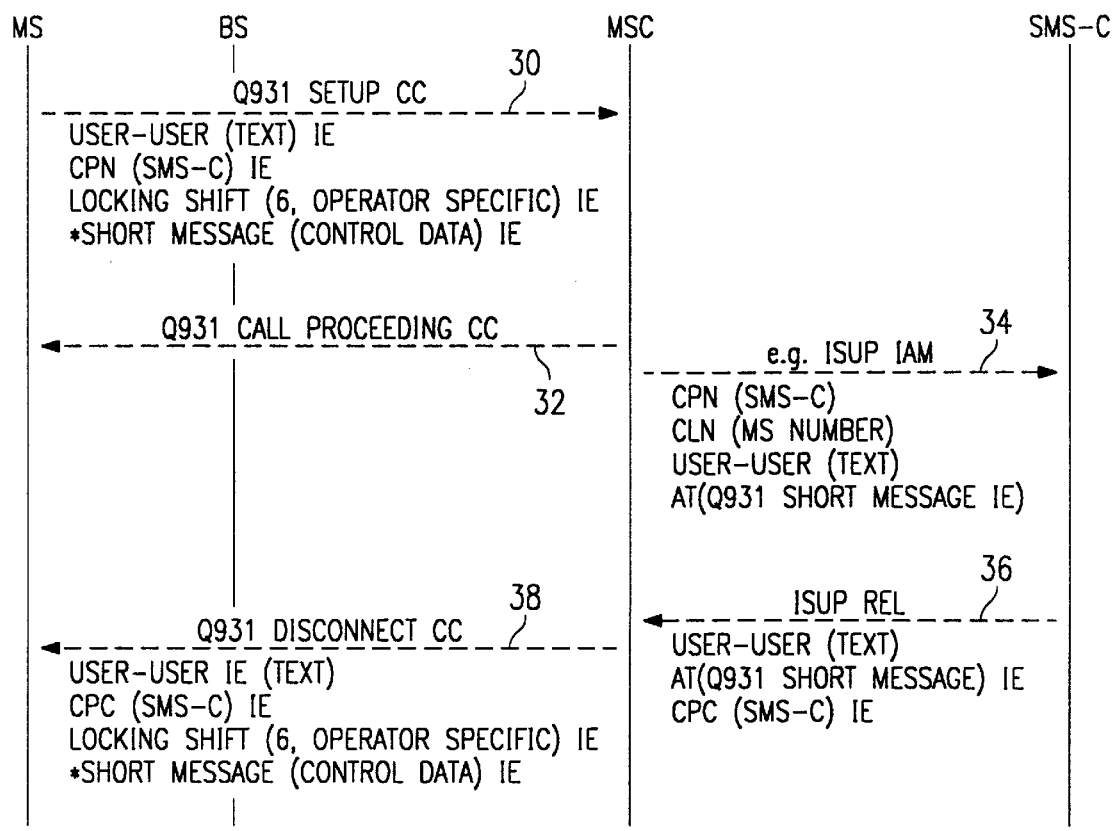
FIG. 2 is a sequence diagram that illustrates the steps of setting up and sending a mobile originated short message, in accordance with the preferred embodiment of the present invention.

FIG. 2 is a sequence diagram that illustrates the steps of setting up and sending a mobile originated short message, in accordance with the preferred embodiment of the present invention. Generally, the preferred method uses a Q.931 locking shift procedure to introduce a novel short message control data information element (SMCIE) into a Q.931 call control set up message, which is sent from the mobile station to the MSC or vice versa. The SMCIE contains the short message control data, and the Q.931 UUIE (optional) can contain the short message text. Preferably, the Q.931 locking shift-6 (operator specific) information element is used to create and define the SMCIE. The preferred method also uses the access transport parameter in an ISUP initial address message (IAM) in a novel way to transport the short message control data between the SMS-C and the MSC.

For example, referring to FIGS. 1 and 2, when a user at mobile station 26 desires to send a short message to another party (e.g., to SMT 12 or another mobile station), the user can access a menu and select certain short message control data, such as the other party's destination address, the short message center address (e.g., the called party number or address of the SMS-C), the validity period (e.g., period after which the SMS-C will discard the message), and the preferred delivery time. The user can also type in the short message text. Preferably, the user types alphanumeric characters into a memory location in the mobile station.

When the user "orders" mobile station 26 to transmit the short message (e.g., by pressing a "send" key), at step 30 in FIG. 2, the mobile station inserts and transmits the specified short message text and control data in a Q.931 call control set up message. Mobile station 26 inserts the short message text in the Q.931 UUIE, the SMS-C address in the Q.931 called party number information element (CPNIE), and the remainder of the short message control data in the new SMCIE (as created and defined by the Q.931 call control set up locking shift codeset-6 information element). In this embodiment, the Q.931 protocol is followed, so the SMCIE field is preceded by the locking shift-6 information element field, which is preceded by the UUIE field. However, the present invention is not intended to be so limited, and any ordering of these fields that is practically possible would be covered by the inventive concept.

Preferably, for call set up, mobile station 26 transmits a Q.931 call control set up message over a random access channel to MSC 20 requesting a signaling channel. The Q.931 call control set up message, which includes the short message text information and control data, is received by base station 24 and coupled to MSC 20. Step 30 may be initiated by a mobile station operating in the idle mode (has no ongoing calls). Step 30 may also be initiated by a mobile station with an already established connection for an existing call, if, for example, the Enquiry Call Supplementary Service is activated. In that case, the short message Q.931 call setup is transferred with a call reference different than the existing call's reference, and the short message call is handled as a separate call. In an alternate embodiment, the short message can be transmitted over another channel, such as, for example, a stand alone dedicated control channel (SDCCH), a slow associated control channel (SACCH), or a non-dedicated channel.

At step 32 in FIG. 2, MSC 20 transports a Q.931 "call proceeding" call control message to mobile station 26. This message indicates to the mobile station that the short message has been validated and is in the process of being forwarded to SMS-C 14.

In the preferred embodiment, the SMCIE inserted in the Q.931 call control set up message includes a plurality of 8 bit data fields (octets). For example, the SMCIE contains an 8 bit SMCIE identifier field and a separate 8 bit SMCIE length indicator field. The SMCIE also contains an 8 bit identifier field and a separate 8 bit length indicator field for each of the short message control data elements (validity period, etc.) included in the SMCIE. These identifier and length indicator fields enable MSC 20 (and, ultimately SMS-C 14) to efficiently extract the short message control data from the SMCIE. The SMCIE may also include a short message version data field, which includes an 8 bit identifier field and 8 bit length indicator field. This short message version data field can be used to notify the receiving SMS-C (14) about the type of short message control data that will be included in the subsequent fields of the SMCIE. This feature advantageously allows the receiving SMS-C to readily differentiate between types of mobile stations (e.g., older mobile terminals may send different control data than newer terminals). An example of an SMCIE and the data fields that can be included therein is described in more detail below.

At step 34, MSC 20 forwards the Q.931 call control set up message including the short message text and control data to SMS-C 14. In the GSM, a short message is transported from an MSC to the receiving SMS-C using the standard network interface signaling GSM Mobile Application Part (MAP) protocol. In systems other than the GSM, the use of the MAP protocol to transport a short message to a receiving SMS-C is relatively inefficient and thus problematic. For example, fixed ISDNs use a number 7 signaling-based ISDN user part (ISUP) protocol. Consequently, the use of a MAP protocol would force the fixed ISDNs to introduce and use a new MAP protocol over the existing ISUP protocol. Furthermore, since many SMS-Cs are integrated with a voice mail system center, and such voice mail system centers use an ISUP protocol to communicate with an MSC, it is advantageous to use that already existing ISUP protocol for communications between the SMS-C and the MSC. In this embodiment, this problem is resolved by transporting the short message text and control data from the MSC to the receiving SMS-C using an ISUP protocol.

At step 34, MSC 20 forwards the short message text and control data to SMS-C 14 using an ISUP interface protocol. The ISUP initial address message (IAM) from MSC 20 carries the called party number (address of the destination SMS-C) and calling party (mobile station) number data received from mobile station 26. MSC 20 extracts the short message text data received from the mobile station in the Q.931 UUIE, and inserts the text data into the ISUP user-user service 1 explicit parameter field. The ISUP protocol allows Q.931 information elements to be transported in the ISUP access transport (AT) field. The MSC inserts the locking shift-6 element and the SMCIE short message control data into the ISUP AT field. Consequently, the SMCIE data can be transferred "transparently" through the MSC to the SMS-C (i.e., with no explicit recognition of the SMCIE data transfer required by the MSC).

At step 36, SMS-C 14 extracts and analyzes the short message text and control data received in the ISUP IAM. The results of the analysis are returned as short message control data in an SMCIE. The locking shift-6 element and SMCIE are packed into the AT parameter of an ISUP release (REL) message. As a user option, SMS-C 14 can send an optional return text message in the ISUP user-user service 1 explicit parameter of the REL message that can state "goodbye" or "message received and processed" for a properly formatted message. The SMS-C returns an address complete message (ACM) to MSC 20 (as for a normal call), and the SMS-C will release the connection to the MSC after completing the short message process. Notably, an important technical advantage of releasing (REL) the connection after an ACM, is to minimize the circuit holding time as much as possible.

At step 38, MSC 20 can insert the optional user-user text message received from the SMS-C into a Q.931 UUIE. The optional UUIE and the locking shift-6 element and SMCIE received from the SMS-C in the AT parameter are transferred to mobile station 26 (via base station 24) in a standard Q.931 call control disconnect message. This initiates the release of the link between the mobile station and the network.

A short message to a mobile subscriber can also be submitted to the SMS-C from a fixed terminal. For example, referring to FIG. 1, when a user at SMT 12 desires to send a short message to a mobile station (26), the user can access a menu and select short message control data, such as the mobile station's number (called party number or CPN), the validity period, and the preferred delivery time. The user can also type in the short message text. The short message text can be input by a variety of sources (e.g., typed alphanumeric characters, speech, facsimile, telex). The short message text and selected control data are transferred to SMS-C 14 via data line 13.

Figure 3:
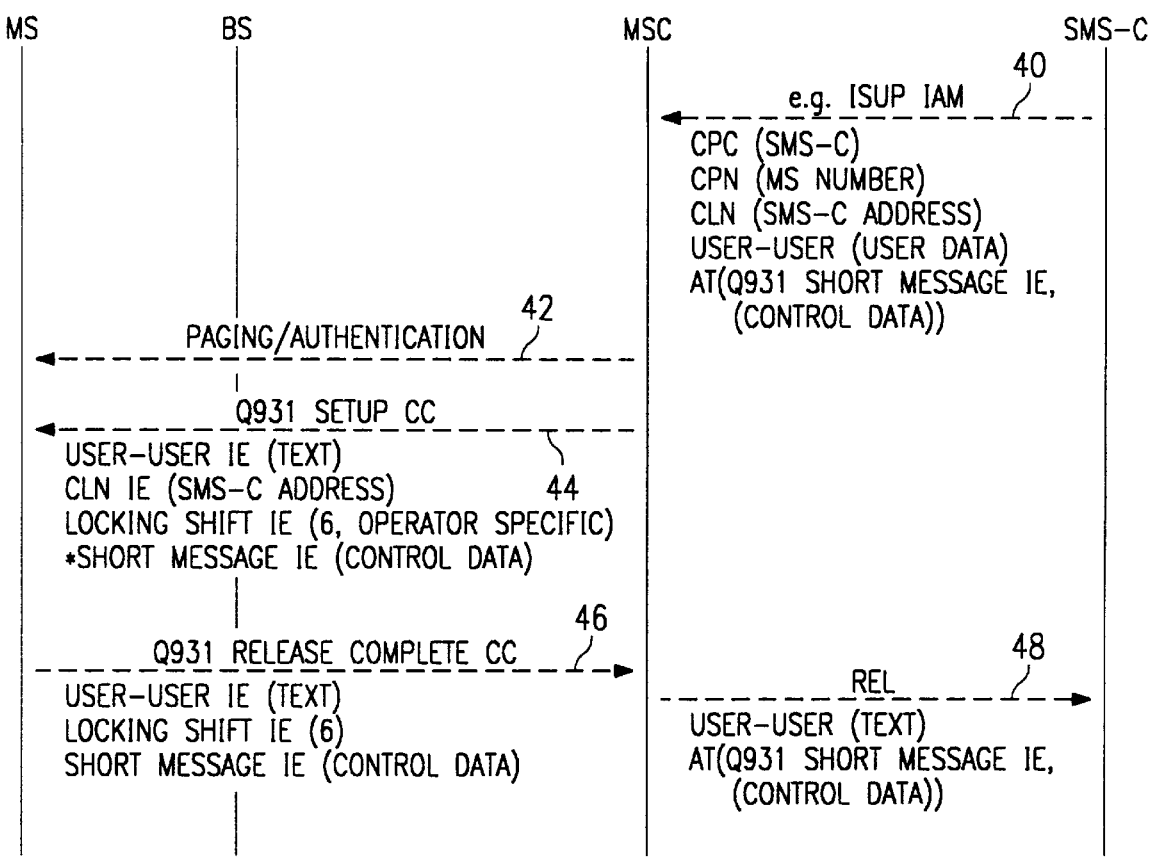
FIG. 3 is a sequence diagram that illustrates the steps of setting up and sending a mobile terminated short message, in accordance with the preferred embodiment of the present invention.

FIG. 3 is a sequence diagram that illustrates the steps of setting up and sending a mobile terminated short message, in accordance with the preferred embodiment of the present invention. Again, the preferred method uses a Q.931 locking shift procedure to introduce a short message control data information element or SMCIE into a Q.931 call control set up message. However, for a mobile terminated short message, the SMCIE is sent from the MSC to the mobile station. Similar to the mobile originated short message method described above, the SMCIE for a mobile terminated short message contains the short message control data, and the Q.931 UUIE can contain the short message text. Preferably, the Q.931 locking shift-6 (operator specific) information element field is used to create and define the SMCIE.

At a predetermined delivery time (or subsequent time if a short message cannot be delivered), SMS-C 14 attempts to deliver the short message to the destination mobile station (26). At step 40 in FIG. 3, SMS-C 14 allocates a dedicated circuit to MSC 20 and transports a short message to the MSC using an ISUP IAM. The ISUP IAM can include calling party category (CPC) data, which is used to indicate to MSC 20 that the incoming message is from an SMS-C. Consequently, the MSC can ensure that the short message is not call forwarded, if that function has been activated by the destination mobile station (26). Also, the MSC can forward the CPC to HLR 18, which allows the HLR to determine whether the destination mobile station is capable of receiving the short message (i.e. is an SMS subscriber). If not, the message can be terminated.

The ISUP IAM also includes the CPN (addressed mobile station number) and the calling party number (CLN), which, in this embodiment, contains the address of the originating SMS-C (14). The ISUP user-user service 1 explicit parameter field can contain the short message text. The ISUP AT message contains the locking shift-6 element and SMCIE. The SMCIE, in turn, contains the short message control data (e.g., validity period, time message sent, etc.). If the MSC determines that the fields in the ISUP IAM are formatted properly, the MSC sends an ACM (e.g., "information OK") to the originating SMS-C.

At step 42, MSC 20 (already determined by GMSC 16 to be the receiving MSC in which the destination mobile station resides), uses a standard paging and authentication procedure to establish an initial link between the base station (24) and the destination mobile station (26). For example, MSC 20 orders base station 26 to transmit a page in the specific location area in which the destination mobile station last made contact. Mobile station 26 responds to the page by transmitting a terminating condition report to a specific cell defined by the base station. This report is passed to the MSC, which can thus determine the identity of the cell in which the mobile station responded. MSC 20 performs an authentication of the mobile station (26), allocates a traffic channel, and orders the mobile station to switch to the allocated traffic channel. Further signaling is accomplished on a signaling link on this traffic channel.

At step 44, once the signaling channel link has been established, MSC 20 sends a Q.931 call control set up message to mobile station 26 (via base station 24). The call control set up message contains the short message text in the Q.931 UUIE field(inserted at the MSC), along with the address of SMS-C 14 in the CLN information element field. MSC 20 extracts the locking shift-6 element and SMCIE from the AT parameter of the incoming IAM, and includes this in the setup message. Using the locking shift-6 information element to create an SMCIE, MSC 20 inserts and transfers the short message control data in the SMCIE field.

At step 46, having received the short message via the Q.931 call control set up message, mobile station 26 recognizes immediately that this is a short message and not a speech call, by the presence of the SMCIE in the setup message. Consequently, mobile station sends a Q.931 release complete (REL COMP) call control message to MSC 20, which immediately terminates the link between mobile station 26 and base station 24. The release message can contain an optional text message (in the Q.931 UUIE of the REL COMP message) as a response to the original short message text information. For example, this release message could state "message received". Or, the release message could be, for example, from a vending machine responding with the number of drink cans or bottles left in the machine. The mobile station can also insert a locking shift-6 element and SMCIE in the REL COMP message, in which the SMCIE contains information on the result of the delivery of the original short message (e.g., "message received" or "memory full"). The control data for the release message is preferably included in the SMCIE field.

At step 48, MSC 20 sends the returned locking shift-6 element and SMCIE, and optional returned user text message in the ISUP REL message to SMS-C 14. The locking shift-6 element and SMCIE are carried in the AT parameter of the REL message, and the optional returned user text message is included in the UUIE parameter. The short message control data is thus included in the ISUP AT parameter. The SMS-C is thereby notified about the result of the message delivery. The REL message releases the connection from MSC 20 to SMS-C 14.

If the destination mobile station is busy or not reachable when SMS-C 14 attempts to deliver the short message, MSC 20 sends a release message to the SMS-C (using an ISUP REL message) along with a "cause" code. The cause code identifies the reason why the short message could not be delivered. The originating SMS-C (14) can store the message and attempt to deliver it at another time. If the destination subscriber has a standard supplementary "call waiting" service activated, the mobile terminated short message can be transferred from MSC 20 to the mobile station even if the mobile station is busy, by establishing a parallel second call with another call reference.

Figure 4D:
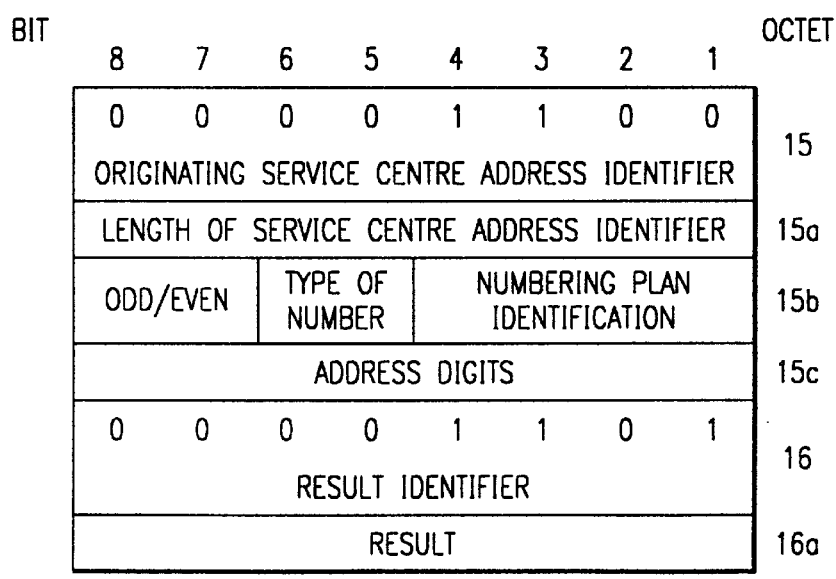

FIGS. 4A–D are related diagrams illustrating an exemplary SMCIE that can be used to transport short message control data in a Q.931 call control set up message, in accordance with the preferred embodiment of the present invention. Referring to FIGS. 4A–D, the illustrative SMCIE contains a plurality of 8 bit (octet) data fields. The first data field (octet 1) contains the locking shift-6 code set (FIG. 4A). The locking shift field is shown in this figure as the first field in the SMCIE, for illustrative purposes only. Preferably, the locking shift field is a separate element that precedes the SMCIE. The second field in the illustration contains the SMCIE identifier, and the third field contains the length of the SMCIE. The fourth field contains the short message version, which can be used to determine the type of terminal being used and control data being transported. The fourth field also contains a short message service request, such as, for example, a mobile station to SMS-C short message submission, or an SMS-C to mobile station short message delivery.

The fifth data field in the illustrative SMCIE includes the (short message) originating address identifier. This field also includes data about the length of the originating address information element, whether the number of digits in the address is an odd or even number, type of number given for originating address (subscriber number, international number, etc.), numbering plan identification (ISDN/ telephone numbering plan, telex numbering plan, etc.), and address digits (alphanumeric or BCD type of number).

The sixth data field in the SMCIE includes the SMS-C time stamp data (delivery day, hour and minute). The seventh data field includes the message reference data (cyclic short message number from 0-255) as set by the mobile station at the originating SMS-C. The eighth data field (FIG. 4B) includes the deferred time delivery data (coded similar to the SMS-C time stamp data). The ninth data field includes the validity period data (also coded similar to the SMS-C time stamp data).

The tenth data field in the illustrative SMCIE includes the message status data, such as, for example, short message received by mobile station or SMT, temporary error 1 (SMS-C still attempting to deliver message), permanent error (incompatible destination, etc.), and temporary error 2 (SMS-C no longer attempting to deliver message). The eleventh data field includes the message protocol used, such as, for example, standard message, Group 3 facsimile, X.400, etc.).

The twelfth data field (FIG. 4C) includes the destination address (coded similar to the originating address). The thirteenth data field includes the message notification request (notification report requested/not requested) and priority (normal or high priority). The fourteenth data field includes the message reception time (time received at destination), which is coded similar to the SMS-C time stamp data. The fifteenth data field includes the originating SMS-C address (coded similar to the originating address). The sixteenth data field includes the result (OK, not OK) of the message delivery attempt.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A method for transporting short messages in a digital telecommunications system in which a standard call control protocol is used to connect a plurality of subscriber stations to said system, said method comprising the steps of:

creating a short message including user information and control data at a first of said plurality of subscriber stations;

inserting said short message user information into a user information field in a call setup message, in accordance with said standard call control protocol;

by inserting a predetermined code into a locking shift information field in said call setup message, creating a short message control data field in said call setup message;

inserting said short message control data into said short message control data field in said call setup message; and transporting said call setup message from said first of said plurality of subscriber stations to said system.

2. The method according to claim 1, wherein said standard call control protocol comprises a Q.931 call control protocol.

3. The method according to claim 2, wherein said user information field comprises a user-user information element.

4. The method according to claim 2, wherein said short message control data field comprises a short message control information element.

5. The method according to claim 2, further comprising the step of inserting a called party number in a called party number information field.

6. The method according to claim 1, wherein said system comprises a Public Land Mobile Network.

7. The method according to claim 1, wherein said system comprises an Integrated Services Digital Network.

8. The method according to claim 1, wherein said first of said plurality of said subscriber stations comprises a mobile station.

9. The method according to claim 8, wherein said transporting step comprises the step of transporting said call setup message from said mobile station to a mobile services switching center in said system.

10. The method according to claim 1, wherein said first of said plurality of subscriber stations comprises a fixed terminal.

11. A method for transporting short messages in a digital telecommunications system in which a standard call control protocol is used to connect a plurality of subscriber stations to said system, said method comprising the steps of:
    creating a short message including user information and control data at a first of said plurality of subscriber stations;
    inserting said short message user information into a user information field in a call setup message, in accordance with said standard call control protocol;
    by inserting a predetermined code into said call setup message, creating a short message control data field in said call setup message;
    inserting said short message control data into said short message control data field in said call setup message;
    transporting said call setup message from said first of said plurality of subscriber stations to said system;
    wherein said predetermined code is inserted into a locking shift information field; and
    wherein said predetermined code comprises a locking shift-6 code.

12. A method for transporting a short message comprised of user information and control data from a digital telecommunications system to a subscriber terminal, said method comprising the steps of:
    by inserting a predetermined code into a locking shift information field in a call setup message, creating a short message control data field in said call setup message;
    inserting said short message control data into said short message control data field in said call setup message; and
    transporting said call setup message from said system to said subscriber terminal.

13. The method according to claim 12, further comprising the step of inserting said short message user information into a user information field in said call setup message, in accordance with a standard call control protocol.

14. The method according to claim 13, wherein said standard call control protocol comprises a Q.931 call control protocol.

15. The method according to claim 14, further comprising the step of inserting a calling party number in a calling party number information field.

16. The method according to claim 14, further comprising the step of inserting a calling party number in a short message control information element field.

17. The method according to claim 14, wherein said user information field comprises a user-user information element.

18. The method according to claim 14, wherein said short message control data field comprises a short message control information element.

19. The method according to claim 12, wherein said digital telecommunications system comprises a Public Land Mobile Network.

20. The method according to claim 19, wherein said transporting step comprises the step of transporting said call setup message from a mobile services switching center in said Public Land Mobile Network to a mobile subscriber terminal.

21. The method according to claim 12, wherein said digital telecommunications system comprises an Integrated Services Digital Network.

22. The method according to claim 12, wherein said subscriber terminal comprises a fixed terminal.

23. A method for transporting a short message comprised of user information and control data from a digital telecommunications system to a subscriber terminal, said method comprising the steps of:
    by inserting a predetermined code into a first field in a call setup message, creating a short message control data field in said call setup message;
    inserting said short message control data into said short message control data field in said call setup message;
    transporting said call setup message from said system to said subscriber terminal;
    wherein said first field comprises a locking shift information field; and
    wherein said predetermined code comprises a locking shift-6 code.

24. A method for transporting a short message comprised of user information and control data between a digital telecommunications system and a short message service center, said method comprising the steps of:
    inserting said short message control data in an access transport field of an initial address message, in accordance with an ISUP protocol; and
    transporting said initial address message between said digital communications system and said short message service center.

25. The method according to claim 24, further comprising the step of inserting said short message user information into a user field of an initial address message, in accordance with said ISUP protocol.

26. The method according to claim 24, further comprising the steps of:
    inserting an identity of said short message service center in a called party number field of said initial address message;
    inserting an identity of an originator of said short message in an access transport field of said initial address message; and
    transporting said initial address message from said digital communications system to said short message service center.

27. The method according to claim 24, further comprising the steps of:
    inserting an identity of said short message service center in a called party number field of said initial address message;
    inserting an identity of an originator of said short message in a calling party number field of said initial address message; and
    transporting said initial address message from said digital communications system to said short message service center.

28. The method according to claim 24, further comprising the steps of:

inserting an identity of said short message service center in an access transport field of said initial address message;

inserting an identity of a recipient of said short message in a called party number field of said initial address message; and transporting said initial address message from said short message service center to said digital communications system.

29. The method according to claim 24, wherein said digital communications system comprises a Public Land Mobile Network.

30. The method according to claim 29, wherein said Public Land Mobile Network further comprises a mobile services switching center.

31. The method according to claim 24, wherein said digital communications system comprises an Integrated Services Digital Network.

32. The method according to claim 24, wherein said step of inserting further comprises the step of inserting a locking shift element in said access transport field of said initial address message.

33. A method for transporting a response short message comprised of text information and control data from a digital telecommunications system to a subscriber terminal, said method comprising the steps of:

inserting said response short message control data in an access transport field of a release message, in accordance with an ISUP protocol; and transporting said release message from a short message service center to a circuit-switched network;

by inserting a predetermined code into a first field in a disconnect call control message, creating a short message control data field in said disconnect call control message;

inserting said short message control data into said short message control data field in said disconnect call control message; and transporting said disconnect call control message from said circuit-switched network to said subscriber terminal.

34. The method according to claim 33, further comprising the steps of:

inserting said response text information into a user-user parameter of said release message; and transferring said response text information from said user-user parameter of said release message to a user-user information element of said disconnect call control message.

35. A method for transporting a response short message comprised of text information and control data from a subscriber terminal to a digital telecommunications system, said method comprising the steps of:

by inserting a predetermined code into a first field in a release complete call control message, creating a short message control data field in said release complete call control message;

inserting said response short message control data into said short message control data field in said release complete call control message;

transporting said release complete call control message from said subscriber terminal to a circuit-switched network;

transferring said response short message control data to an access transport field of a release message, in accordance with an ISUP protocol; and transporting said release message from said circuit-switched network to a short message service center.

36. The method according to claim 35, further comprising the steps of:

inserting said release text information in a user-user information element of said release complete call control message; and transferring said release text information from said user-user information element of said release complete call control message to a user-user parameter of said release message.

37. The method according to claim 35, wherein:

said first field comprises a locking shift information field; and said step of transferring further comprises the step of transferring a locking shift element to said access transport field of said release message.

38. A digital telecommunications system for use in transporting a short message between at least two subscriber terminals capable of interconnecting with said digital telecommunications system, comprising:

a first of said at least two subscriber terminals operable to:
create a short message including user information and control data;

by inserting a predetermined code into a first field in said call setup message, in accordance with a standard call control protocol, create a short message control data field in said call setup message;

insert said short message control data into said short message control data field in said call setup message; and transport said call setup message to said system;

a circuit-switched network interconnected with said first of said at least two subscriber terminals and operable to:

receive said call setup message;

insert said short message control data from said call setup message in an access transport field of said initial address message, in accordance with an ISUP protocol; and transport said initial address message from said system; and a short message service center connected to said circuit-switched network and operable to:

receive said initial address message transported from said circuit-switched network;

extract said control data from said received initial address message; and forward said short message to a second of said at least two subscriber terminals.

39. The system according to claim 38, wherein said first of said at least two subscriber terminals is further operable to insert said short message user information into a user information field in said call setup message, in accordance with said standard call control protocol.

40. The system according to claim 38, wherein said circuit-switched network is further operable to insert said short message user information from said call setup message into a user field of said initial address message, in accordance with said ISUP protocol.

41. The digital telecommunications system according to claim 38, wherein said system comprises a Public Land Mobile Network.

42. The digital telecommunications system according to claim 38, wherein said system comprises an Integrated Services Digital Network.

* * * * *